April 25, 1967  S. N. BLACKMAN  3,316,076
METHOD OF MARKING MERCURY GLASS THERMOMETERS
Filed Dec. 18, 1964  3 Sheets-Sheet 1

INVENTOR
SEYMOUR N. BLACKMAN
BY
ATTORNEYS

April 25, 1967  S. N. BLACKMAN  3,316,076
METHOD OF MARKING MERCURY GLASS THERMOMETERS
Filed Dec. 18, 1964  3 Sheets-Sheet 2
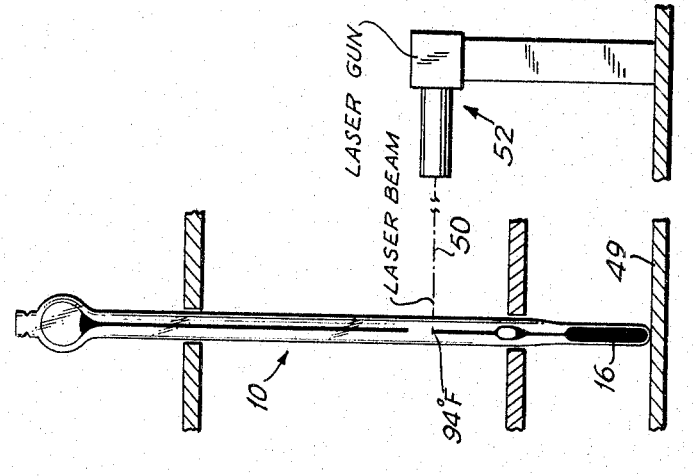
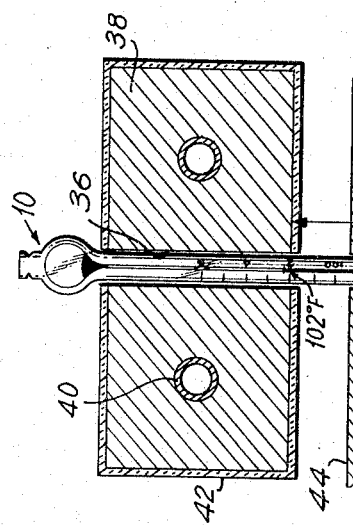
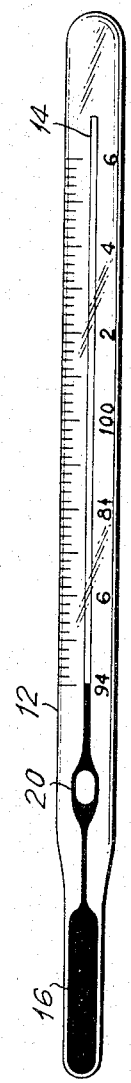
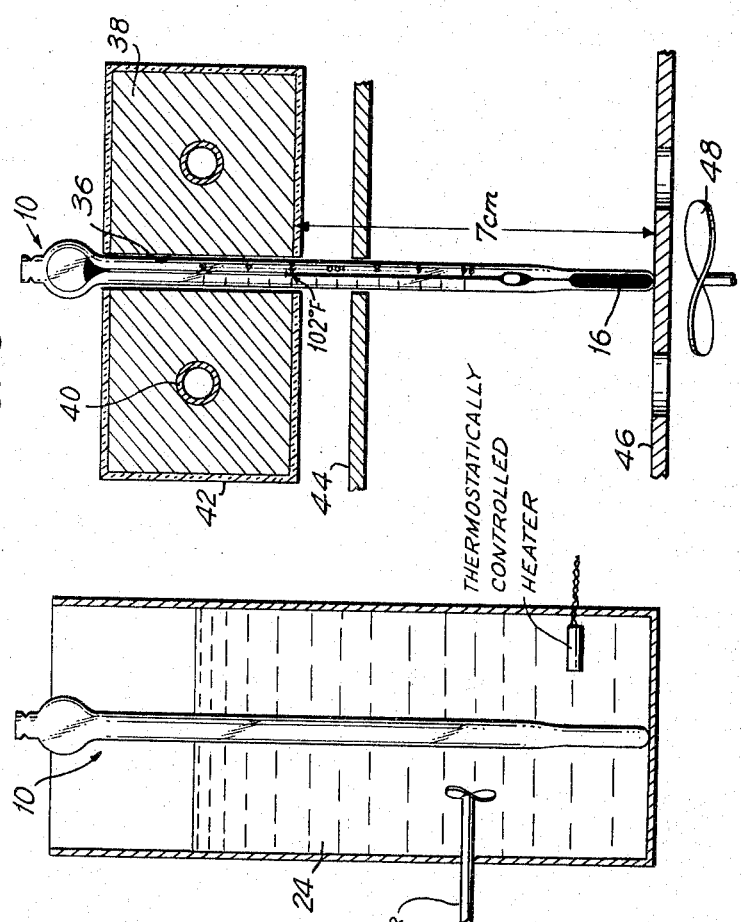
INVENTOR
SEYMOUR N. BLACKMAN
BY
ATTORNEYS April 25, 1967 S. N. BLACKMAN 3,316,076
METHOD OF MARKING MERCURY GLASS THERMOMETERS
Filed Dec. 18, 1964 3 Sheets-Sheet 3
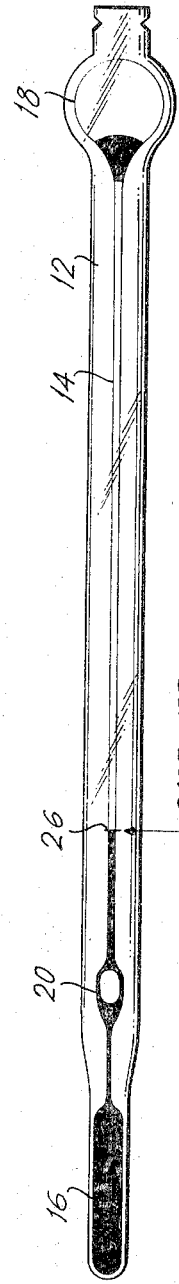
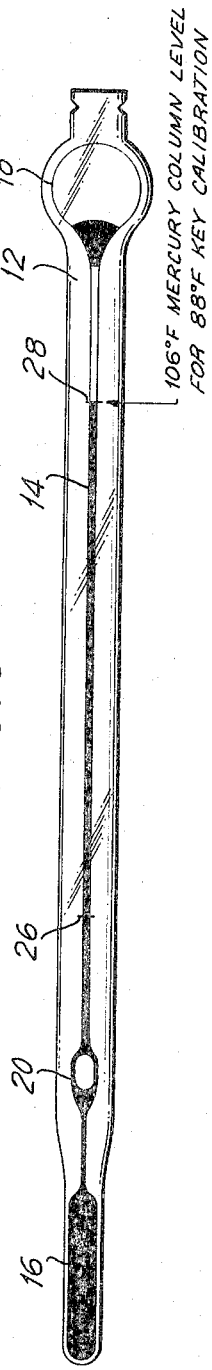
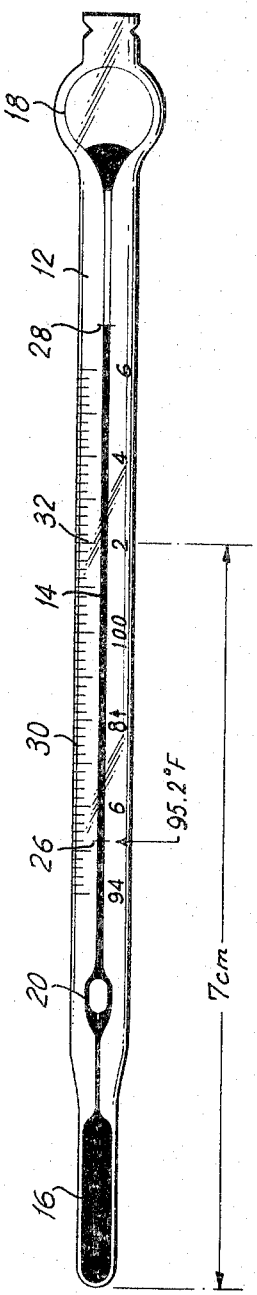
INVENTOR
SEYMOUR N. BLACKMAN

United States Patent Office 3,316,076
Patented Apr. 25, 1967

3,316,076
METHOD OF MARKING MERCURY GLASS THERMOMETERS
Seymour N. Blackman, 431 E. Palisade Ave., Englewood, N.J. 07631
Filed Dec. 18, 1964, Ser. No. 419,523
11 Claims. (Cl. 65—30)

This invention relates to a method of marking mercury glass thermometers.

Although my invention wil be described hereinafter by way of example with respect to glass clinical thermometers, I wish to mention at this point that my invention is not so limited but pertains to the marking of all types of glass thermometers, that is to say, commercial glass thermometers as well as clinical glass thermometers. Examples of commercial glass thermometers are: chemical melting point thermometers, water bath thermometers, outdoor thermometers, and boiler thermometers which in general are characterized by a glass stem of any shape of cross-section, e.g., circular, and by the presence or absence of a trap, and by temperature graduations on the stem itself.

A clinical, i.e. fever, thermometer of either the rectal, oral or stubby type conventionally comprises a straight shaft of roughly triangular cross-section with a rectilinear axial capillary bore therein that terminates at one end in a thin-walled reservoir bulb. The bulb contains a liquid which expands upon the application of heat, such, for instance, as mercury, the expansion, and, therefore, the temperature, being measured by the rise of a column of the liquid in the capillary bore. Such thermometers customarily are made of transparent material, and almost invariably of glass. The actual cross-section of the thermometer is such that a rounded corner of the shaft acts as a lens to magnify the tiny diameter of the bore in which the liquid rises. It should be observed that in some thermometers, usually commercial thermometers, where the capillary bore is somewhat larger than that of a clinical thermometer, it is not necessary to employ such a lens portion, and, therefore, the stem may be of circular cross-section.

Heretofore there have been three general types of marking. The latest and most popular is a flush stained as embodied in clinical thermometers. The oldest two are an etched and filled marking and a raised ceramic marking. The latest and most popular in a flush stained marking.

The etched and filled type of thermometer marking is subject to the drawback that the filling material, be it pigment or ceramic, tends to loosen and fall out which makes the thermometer difficult to read and opens pockets for contamination. Moreover, and importantly, the removal of glass by etching leaves the thermometer locally weakened at each mark which thereupon acts as a focus for breakage. Thermometers with raised ceramic markings are subject to leaching of pigment from the raised markings and to chipping of the markings during day-to-day handling of the thermometer and to differential expansion of the marking and glass shaft upon cooling after the firing which fuses the marking in place. Furthermore, when fragments of the marking chip off the glass shaft they take with them adhered fragments of the shaft which leaves the thermometer shaft locally weakened.

It also has been proposed, as shown in my United States Letters Patent No. 2,707,688 and in United States Letters Patent No. 2,811,040, to stain the shafts of glass clinical thermometers.

In the earlier of these patents the staining was performed by induction heating and, although the ensuing thermometer was desirable by virtue of flush stained markings, the uneven heating of the glass shaft at the discrete points where the stain markings were incorporated into the glass left many stress points as a result of which the thermometer was subject to easy breakage. It may be noted that such stressing could be avoided if the induction heating were carried out at a sufficiently low temperature, viz, about 600° F., instead of 780° F., but this is commercially impractical because in such event the time cycle for staining is increased from one-half hour for the higher temperature to five or six hours for the lower temperature.

The thermometer shown in Patent No. 2,811,040 likewise is subject to a serious commercial drawback, to wit, local removal at the marking points of the surface portions of the glass shaft by etching, the etched pockets subsequently being stained. Not only would the construction therein proposed leave a zone of weakness at each etched zone, but the method disclosed for heating the shaft while concurrently cooling the mercury bulb would leave a substantial residual stress in the zone between the bulb and the shaft which makes the thermometer particularly susceptible to breakage at this zone when subjected to shock or pressure.

I have, in my United States patent application Ser. No. 166,596 for "Glass Thermometer and Method and Apparatus for Making the Same," filed Jan. 16, 1962, now U.S. L.P. 3,172,289 dated Mar. 9, 1965, disclosed a thermometer which is not subject to any of the foregoing drawbacks. Thus, in said thermometer there are no etched portions, there are no raised markings, there are no prohibitively high stresses at the markings and there is no zone of stress between the mercury bulb and the marked part of the shaft. In this thermometer, which is substantially stress-free over its entire marked area and continuing down through the entire mercury bulb portion, the markings are flush and are in the form of stains that penetrate the surface of the glass shaft.

Although the thermometer itself has had excellent commercial acceptance due to all of the foregoing advantages, there are certain drawbacks attendant upon its previous method of manufacture as disclosed in said Patent No. 3,172,289. For example, said method required accurate time-temperature controls in both the annealing and the baking cycles in order to secure sufficiently close repetition of the readings on finished thermometers. Also, this process required the formation and subsequent optional removal of an expansion chamber (in addition to another chamber) communicating with the bore and located at the distal end of the thermometer in order to accommodate expansion of mercury during the baking (staining) cycle. Still further, the disclosed method required the very careful registration of the applied markings of staining material with previously applied "points" on the thermometer shaft. Another drawback of the aforesaid previously disclosed method is that it necessitated the use of two heat treatments for the thermometer each of which consumed additional time and required additional equipment and labor.

It is an object of my present invention to provide a method of making a substantially stress-free flush marked mercury glass thermometer having none of the drawbacks above mentioned of the process described in my aforesaid Patent No. 3,172,289.

More specifically, it is an object of the present invention to provide a method of the character described wherein only a single heating cycle is practiced which encompasses both the annealing and baking steps and in which the time and temperature, although still necessarily carefully controlled, are not of the same critical nature as they were in the aforesaid process.

It is another object of my invention to provide a method of the character described wherein the thermometer may be baked, marked and annealed without the use of the second chamber by utilizing in lieu thereof the conventional calibration chamber.

It is another object of my invention to provide a method of the character described in which it is not necessary for the applied markings to be precisely registered with previously positioned "points" on the thermometer shaft.

It is another object of my invention to provide a method of the character described which will produce thermometers having a more uniform mass appearance and specifically having the scales thereof centered about a common point, e.g., 102° F., intermediate the ends of the scale, so that when groups of thermometers are assembled, as for sale, the scales will not present a randomly staggered appearance as they have heretofore, but will appear to be centered at the aforesaid common point, 7 centimeters, for example, from the base of the mercury bulb.

It is another object of my invention to provide a method of the character described which can be practiced with comparatively inexperienced help at a low cost and by mass production techniques.

Other objects of my invention in part will be obvious and in part will be pointed out hereinafter.

My invention accordingly consists in the various series of steps which will be exemplified in the processes hereinafter described and of which the scope of application will be indicated in the appended claims.

In the accompanying drawings in which are shown devices for carrying out my invention and thermometers at various stages of the processes, FIG. 1 is a top plan view of an unmarked thermometer blank prior to the practice of my invention thereon;

FIG. 3 is a simplified view of a constant temperature bath with a thermometer blank located therein;

FIG. 5 is a top plan view of the blank showing the mercury column raised to 94° F. after being shaken off at 88° F., said blank having had a low point marking applied thereto;

FIG. 6 is a view similar to FIG. 5 but showing the mercury column raised to 106° F. and with the blank provided with a high point marking;

FIG. 7 is a view of the blank of FIG. 6 with a stain markable scale applied thereto that is matched to the mercury column temperature rise characteristics of the blank but is without consideration to the then existing level of the mercury column for any given temperature;

FIG. 8 is a sectional view of an apparatus for burning off excess mercury in the mercury column of the blank;

FIG. 9 is a top plan view of a thermometer finished by the process of my invention; and FIG. 10 is a side elevational view of a laser gapping apparatus used in a modified form of my invention to register to a stain applied scale a mercury column having a thermal rise characteristic to which the scale is matched.

Figure 1:

In general, I carry out my invention by deviating from conventional mercury glass thermometer manufacturing practices at the point at which the conventional method provides a thermometer blank 10 (see FIG. 1) having a calibrating chamber. For the purpose of reference such a blank 10 constitutes a glass shaft 12 with a capillary bore 14. At one end of the glass shaft a reservoir bulb 16 is affixed or formed; at the other end of the shaft there is a large calibrating chamber 18 which is of a volumetric capacity exceeding that of the bulb. Conventionally, there is a trap 20 between the bulb and the proximal end of the bore, said trap having been provided for maximum temperature recordation purposes in the field and constituting a double V with the tips of the V's joined. Prior to deaeration mercury completely fills the bulb 16, the trap 20 and at room temperature, e.g., 68° F., substantially all of the bore 14 and optionally extending into the calibrating chamber 18. It will, of course, be realized that there is more mercury present than will be required in the finished thermometer, and in etched and filled and raised marked thermometers such excess of mercury is removed by standard methods and discarded with the chamber which later is pinched off together with the adjacent part of the thermometer shaft.

Attention is called to the fact that in this thermometer blank 10 no detrimental amount of residual air or moisture is present below the top of the mercury column in the bore. The same was transferred into the calibration chamber by any standard deaeration technique, for example by chilling the thermometer to 35° F., driving the mercury from the bore and chamber through the trap into the bulb to substantially fill the same, the driving typically being performed by centrifuging the thermometer, bulb outward, vibrating the thermometer in upright position to permit the air and gases to rise within the bulb toward the trap and thereafter at successively higher temperatures, but below the lowest temperature to be read in the finished thermometer, shaking off the mercury from above the trap into the calibrating chamber. Thus, in the deaerated glass blank 10 which now is ready for treatment in accordance with my invention and which is at a room temperature of, for example, 72° F., the level of the mercury is somewhat above or below the trap, e.g. mercury fills the bulb and extends into or slightly beyond the trap, the balance being in the calibrating chamber.

Figure 2:
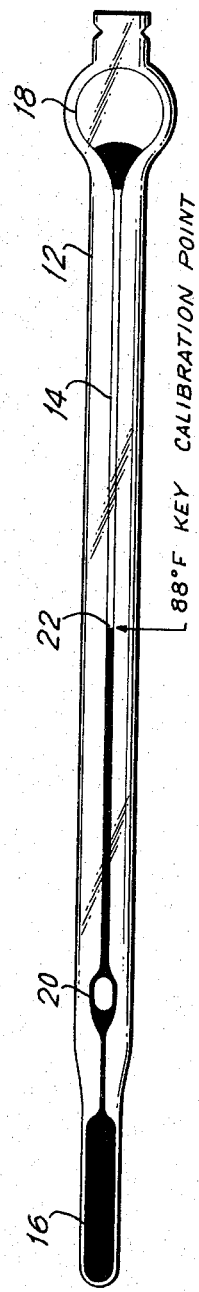
FIG. 2 is a similar view of said blank after being subjected to a key calibration temperature.

Now, in accordance with my invention, I raise the temperature of the thermometer to a certain critical temperature hereinafter referred to as a "key calibration temperature" which is below the lowest temperature to be present on the marked scale of the finished thermometer, but which is high enough to raise the level of the mercury to a key calibration point 22 (FIG. 2) above the top of the trap. This key calibration temperature will be several degrees, e.g., 10° F. to 15° F., above the highest temperature used during the de-aerating process, the latter, for example being 75° F. It is important to note here that although the value of the key calibration temperature may vary between reasonable margins of a few degrees in different embodiments of my invention, whichever key calibration temperature is selected, in this instance, 88° F., the thermometer must be raised exactly and precisely to that temperature for all the thermometers in a given batch being processed, and for this purpose I prefer to use a constant temperature water bath 24 (FIG. 3), the temperature of which is regulated within a small range, for instance, plus or minus $\frac{1}{50}$° F., so that closely precise reproduction of marking subsequently may be effected.

Figure 4:
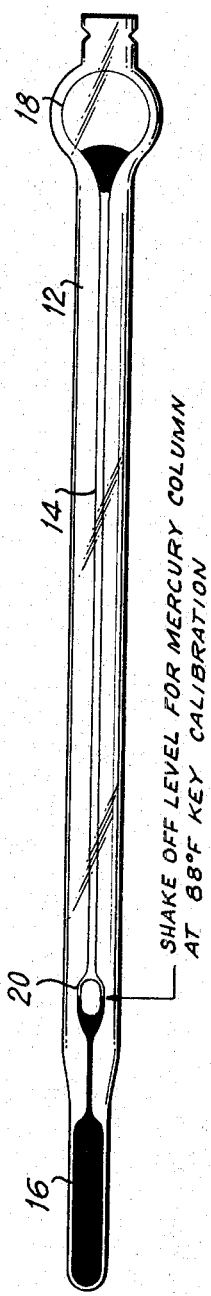
FIG. 4 is a top plan view of said blank showing the mercury column shaken off into the calibration chamber from above the trap, said column previously having been raised to the key calibration temperature.

Next, the thermometer is removed from the constant temperature bath and is allowed to cool below the key calibration temperature, for example, to room temperature or below. The mercury column breaks at the trap in well known fashion. Thereupon, the remainder of the mercury column within the thermometer above the trap is driven into the calibration chamber. It may be observed at this point that whenever I speak of driving the mercury in either direction it may be done by shaking the thermometer or far more simply by employing a spinning type centrifuge such as is commonly used in this field. At this stage (see FIG. 4) a precisely regulated amount of mercury remains in and below the trap and use is made thereof, as soon will be apparent, for calibration purposes.

I now raise the temperature of the thermometer, as in a constant temperature water bath, to a precise temperature which is within the temperature on the scale to be marked and is adjacent the lower end thereof. A suitable temperature, for instance, is 94° F. plus or minus a small range, for example, ⅟₅₀° F. The level of the top of the mercury column is observed (see FIG. 5) and a marking 26 is applied to the lens of the thermometer shaft corresponding with this level. This marking is referred to as the "low point" marking. The marking is applied by means of a marking paint or ink which is not thermally labile, that is to say, which will not disappear at the temperatures later used in the process for baking and annealing that are in the range of about 840° F. to 860° F. However, the paint should be capable of being mechanically removed, as by wiping. For this purpose I use, by way of example, aluminum or bronze radiator paint.

Now I raise the temperature, as in a constant temperature water bath, to an exact higher level (see FIG. 6) which is near the top of the scale of the thermometer, for example 106° F. plus or minus a small range, e.g. ⅟₅₀° F., and apply another marking 28 referred to as the "high point" marking to the thermometer lens with the same or a similar marking ink or paint, with the marking corresponding to the top of the column at this time.

It is appropriate to mention here that the application of the high point marking to the thermometer is an optional but not essential step which I find simplifies the use of my method. My method can be effected with quite satisfactory results with said high point marking omitted.

For the purpose of grading the thermometers in accordance with their mercury column temperature rise characteristics for the subsequent application of accurate permanent scale markings which are appropriate to the particular thermometers involved, I now measure the distance between the high and low point markings or, if the high point marking is omitted, between the low point marking and the top of the mercury column at the high point employed, to wit, 106° F. in the particular example. The measured thermometers thereupon are classified and segregated into separate groups distinct from one another by variation in the lengths between the two points which are functions of their mercury column temperature rise characteristics. The groups vary from one another by some arbitrary small increment, for example, 0.02 inch. I have used this increment because it is well within the ability of a semi-skilled operator to visually resolve differences of this order.

The next step in the practice of my invention is to apply heat stainable markings 30 (see FIG. 7) by means of conventional heat stainable inks such as are used for the stain marking of glass. The heat stainable markings are applied in the form of a conventional thermometer scale, to wit, constituting a series of transverse graduations which subsequently will indicate degrees and decimal parts of degrees. A conventional set of heat stainable markings for clinical thermometers starts at 94° F. for the lower end and has a higher end of either 106° F. or 108° F.

It will be recalled that the thermometers have been classified into different groups the high and low points of which fall within locations which do not vary by more than ²⁄₁₀₀ of an inch. For economy and speed of production I apply the heat stainable markings to a large number of thermometers in a given group in succession and use the stencil the length of which between graduations corresponding to the points is between the longest and shortest point markings of thermometers in the group. For example, if a given group has point markings which vary between 1.73 inches and 1.75 inches, the markings on the stencil corresponding to said points will have a total length of between 1.73 inches and 1.75 inches, preferably, a median length, as for instance, 1.74 inches. Thus the spacing of the stencil graduations matches the mercury column temperature rise characteristic of the thermometers in the group. For this purpose I prefer to employ a stencil such as shown in my said Patent No. 3,172,289 the length of which is selectively adjustable by stretching.

It will be observed that I have not said that, nor in practice do I, apply the aforesaid stencil heat stainable markings in any particular relationship to the locations of the upper and lower point markings 26, 28. The reason for this will become apparent subsequently in this description. However, it is highly desirable to the commercial practice of my invention that some predetermined, i.e. certain, individual graduation 32 of the applied scale of stencil heat stainable graduations be a precise preselected distance 34 from the bottom of the mercury bulb. Best commercial results are secured where the selected individual graduation 32 is intermediate the top and bottom of the applied scale and I prefer to arbitrarily use the graduation corresponding to 102° F. The preselected distance from this graduation to the bottom of the mercury bulb (the external lowermost point on the thermometer) must be accurate to the order of visual readability of an average observer, for example, about plus or minus ⁵⁄₁₀₀₀ to ¹⁰⁄₁₀₀₀ of an inch. Any greater accuracy is not warranted. A lesser accuracy would affect the aesthetic appearance of a group of such thermometers and would interfere with accuracy of a step later to be described. I may employ any preselected distance for the aforesaid measurement within the parameters of the method and the thermometer. Thus one parameter is that the 94° graduation should be above the trap by a commercially acceptable distance. A preselected distance which I favor for the location of the 102° F. graduation and which I find to be highly practical is 7 centimeters for a clinical thermometer, although plus or minus 10% will also give usable results. It will be realized that if a longer thermometer is employed, as for veterinarian purposes, a different preselected distance 34 may be utilized. The distance is so selected that the 102° mark on a finished thermometer is within the range that the mercury column can be adjusted to be set at this temperature.

Next the entire thermometer is heated and cooled to anneal the full length of the thermometer, inclusive of the reservoir bulb, so that the thermometer is substantially uniformly annealed over its full length including the scale marked portion and the zone between the shaft and the reservoir bulb. The heating is carried out at such a temperature as to decompose the heat stainable material and cause migration of nascent metal ions to beneath the surface of the glass whereby to effect stain marking of the graduations.

Desirably the heating is carried out at a temperature sufficiently high, e.g. in the order of 800° F., to enable annealing and stain marking to be accomplished in a reasonably short span, for example about two hours.

In a typical heating and cooling step, the heat stainable marked thermometers are raised from room temperature to 820° F. in 30 minutes. They are held at this temperature for two hours which suffices to stress relieve them to a degree that is commercially acceptable. This same heating period will perform the staining operation. The thermometers thereupon are cooled slowly to room temperature, for example at 50° F. per hour. The baking temperature and the cooling rates are not critical. Thus said baking temperature can vary between about 660° F. and 860° F., it being understood that for lower temperatures a longer time for stress relief and stain marking is required. Likewise the cooling rate above specified is not critical. In accordance with art practice, it is known, however, that more rapid cooling rates at high temperatures create stresses that often are unacceptable. The cooling rate may be more rapid, e.g. 100°F. per hour, below about 660° F.

The residium left from the heat decomposible stainable material is flushed off the shaft.

At this time the thermometer is annealed and has a stain marked scale of graduations that is matched to the mercury column temperature characteristic of the thermometer but the quantity of mercury present, which due to the heating step now is distributed throughout the bulb, the chamber and the bore, is in excess of the amount required for the column to precisely register with the applied stained scale markings. Hence the next step of my process is to remove sufficient excess mercury to secure such precise registration, i.e. to calibrate the mercury column to the stain marked scale.

To this end I visually compare with either the low or high point 26, 28 the corresponding temperature graduation of the stained scale marking freshly permanently integrated with the shaft of a given thermometer. The point selected will be either above (higher than) or below the corresponding temperature graduation. The same step is repeated for each thermometer of a batch and the thermometers are segregated into groups having the same differential between the points and the scales. The variations between the groups typically is 0.1° F. I categorize the groups as + or − degree groups, usually from +3° F. to −3° F. in 0.1° F. increments, the + sign indicating that the scale graduation is lower than the corresponding point and vice versa. For instance, referring to FIG. 7 the thermometer there shown belongs in the +1.2° F. group. A positive (+) correction is made in an appropriate amount for each thermometer in a + group and vice versa.

To make a + correction, first a thermometer is shaken down (all the mercury is driven toward the reservoir bulb, as in a centrifuge), the thermometer is chilled and deaerated as above described, the last shake off being performed at about room temperature, e.g. 74° F. Now the thermometer is placed in a constant temperature bath maintained at a temperature greater than the key calibration temperature by a number of + degrees F. equal to the positive correction. For negative corrections the bath is maintained at a temperature below the key calibration temperature by the number of − degrees F. equal to the negative correction. As a matter of convenience, the largest negative corrections first are made and aer followed by lesser and lesser negative corrections as the bath temperature is increased in small increments of 0.1° F. and then by the smallest positive correction and succeedingly larger positive corrections. Typically the bath will start at 85° F. (88° minus 3°) and finish at 92° F. (88° plus 3°).

It will be recalled that the high and low points were determined from a mercury column calibrated in a key calibration bath of 88° F. with the excess mercury shaken into the expansion chamber. Thereby when I now shake the excess mercury from the recalibrated thermometer into the calibration chamber, the recalibrated column should register within ±0.2° F. with the stained scale of graduations.

Recalibration checking is typically carried out at 102° F. with the process being described. In commercial operation it is observed that about 95% of the re-registered thermometers will fall within the aforesaid acceptable registration tolerance. The other 5% is split between columns that read too high and columns that read too low (>0.2° F.). These must be readjusted (if too high) or reprocessed (if too low).

Reprocessing involves reobserving the original differential between the point markings and the applied scale, and placing the thermometer in a correction category 0.1 or 0.2° F. lower than observed.

Readjustment constitutes "burning off" of the excess mercury in the following manner. The thermometer is threaded through a bore 36 in a heat block 38, composed for example of aluminum that is maintained by electric heaters 40 at a temperature, e.g. 450° F., sufficiently high to vaporize mercury under a high vacuum and below the stress range, 660° F., of the glass. The sides and broad surfaces of the heat block may be covered with a heat insulating layer 42. Moreover, a baffle 44 is interposed between the reservoir bulb 16 and the adjacent surface of the heat block, preferably being close to the heat block and preventing radiant and convective transfer of heat to the reservoir bulb. The aforesaid adjacent surface of the heat block is closely registered with the 102° F. graduation on the thermometer scale, assuming that the thermometer was last heated to 102° F. for recalibration checking. Such registration is effected by a perforated stop plate 46 against which the tip of the bulb 16 abuts and which is 7 cm. from the adjacent surface of the heat block, this being the distance from the 102° F. scale marking to the tip of the bulb initially set into the thermometer when the heat stainable scale graduations were applied.

A fan 48 circulates cool ambient air over the bulb and in the space between the baffle 44 and the perforated plate 46 maintaining the temperature thereat at less than 102° F.

It will be recalled that the thermometers being readjusted read too high so that a given thermometer subjected to a temperature of 102° F. will have the mercury column level with a scale graduation of a higher degree, say 102.3 (if the residual divergence is +0.3° F). Hence when the thermometer is placed in the burn off apparatus and left there for a few minutes, say ten minutes, the mercury in the column above the 102° F. scale graduation will vaporize and will condense in the calibration chamber that is exposed above the heat block or immediately below the same in the area of the thermometer which next will be melted, pinched off and discarded.

Finally the upper end of the thermometer is flame melted below the calibration chamber containing the excess mercury, pinched off and discarded to leave a finished thermometer T (see FIG. 9).

A satisfactory alternate method of recalibrating the mercury column to the applied stain marked scale graduation is to disregard the high and low point markings or to make them of a thermally decomposible material which will be removed as reference points during the heating step. After the stain markings have been imparted the thermometers are shaken down to drive the mercury into the bulb, are deaerated and are placed in a constant temperature bath at the key calibration temperature of 88° F. The mercury above the trap is shaken off (driven) into the calibration chamber and the thermometers are raised to a temperature of 102°F., at which the mercury columns will lie within the stain marked scales. The mercury columns are read against the scales as the number of degrees under or over 102° F. and the thermometers are arranged in groups as described above. For instance a thermometer with a reading of 103.2° F. will be placed in a +1.2° F. group. After shaking down, each group of thermometers is placed in a constant temperature bath of the key water temperature—88° F.—plus or minus the correction and the excess above the trap driven off into the calibration chamber which latter is heated, pinched off and discarded.

Still another method of recalibrating the mercury column to the applied scale is to use a key water that is at least 3° F. lower than the key calibration temperature, e.g. 8° F. lower (a key water temperature of 80° F.), and driving the excess mercury into the calibration chamber. Then the thermometer is raised to 102° F. The reading will in all cases be above 102° F. The thermometers now have the mercury in excess of 102° F. removed in the burn off apparatus described above.

Mention should be made of the fact that it is within the scope of my invention to heat and cool the thermometer blank for annealing purposes, but not for stain marking, prior to ascertaining the mercury column temperature rise characteristic of the blank (the degree of movement of the mercury column in the bore as a function of change in temperature of the mercury in the bulb) and thereafter to proceed as described above with the exception that the heating step for staining will only be high enough, e.g. 700° F., to accomplish stain marking.

A particularly good modified form of my invention involves the same basic steps as above outlined (1) ascertaining the temperature rise characteristic of a mercury column, (2) applying heat stainable markings to match the characteristic but without deliberate registration of the column and markings, (3) heating and cooling the thermometer to form stain markings, (4) matching (registering) the column to the applied markings by removing excess mercury into the calibrating chamber, and finally (5) removing the calibrating chamber with its contained mercury; however this modified method greatly simplifies the first and fourth steps.

Pursuant to the aforesaid modified form, a thermometer blank, previously deaerated, is heated sufficiently, as by boiling, to connect the mercury in the reservoir to the mercury in the calibration chamber as a single continuous mass through the trap and bore. The thermometer is allowed to cool to room temperature, or below, and the mercury in the bore and calibration chamber is driven toward the bulb an amount sufficient to fill the void at the top of the bulb left upon cooling so that a continuous mass is reestablished. Next the thermometer is warmed in a constant temperature water bath to a predetermined temperature which corresponds to a low scalar marking temperature graduation that subsequently will be applied, say 94° F.

Thereupon the mercury column is interrupted (broken, i.e. severed or gapped) at a location which is a predetermined distance from the base (bottom) of the reservoir bulb and above the trap, say one and one-half inches (set by placing the bulb against a plate 49 that is 1½" below the predetermined location), by applying thereto in a direction transverse to the column a narrow high intensity zone of energy such as light energy or heat energy capable of volatilizing a narrow transverse segment of the column without inducing a high local stress in the glass and without volatilizing the mercury on either side of the segment. I have secured excellent results with a laser beam 50 (see FIG. 10) issuing from a laser source 52. The laser beam has a dimension parallel to the length of the mercury column of about 0.005 inches and, in effect, slices out, by volatilizing, a transverse segment of mercury to leave a space (gap) of this thickness in the column. Alternate forms of high intensity narrow zones of energy are those developed by the application of a high frequency electrostatic field or a high frequency mechanically vibrating field.

After the gap is formed in the column, the mercury of the column above the gap slowly rises to increase the mass of the mercury previously present in the calibration chamber. It is to be observed that for this phenomenon to occur the mercury column must be continuous from the gap to the calibrating chamber. The column of mercury below the gap remains quiescent.

Now the thermometer is placed in a constant temperature bath maintained at a temperature which corresponds to a high scalar marking temperature graduation that subsequently will be applied, say 106° F.

The linear distance between the predetermined location (1½" from the plate 49) and the level of the mercury column after removal of the thermometer from the 106° F. bath is ascertained. This distance is a measure of the mercury column temperature rise characteristic and, it will be appreciated, has been determined with greater ease than the first steps outlined above for securing a similar type of measurement. The thermometers are arranged in groups which distinguish from one another in the manner previously described and thereafter have heat stainable markings applied thereto to match the said characteristics as already detailed at length hereinbove. Preferably the 102° F. marking is at the same distance, say 7 cm., from the base of the bulb for the thermometers of all the groups. Now the thermometers are heated and cooled for stain marking and annealing, the latter being optional as mentioned before.

Next the mercury column is precisely registered to the freshly applied stain marked graduations by a step that is simpler to carry out than the equivalent step recited for the earlier described process. This is accomplished by driving the mercury toward the bulb, deaerating the mercury and heating the thermometer to connect the mercury in the column to the mercury in the calibrating chamber so that there is a single continuous mass of mercury from the bulb to the calibrating chamber. Thereupon the thermometer is cooled to room temperature or below and then shaken down to rejoin the mercury in the column to the mercury in the bulb. At this time there is a single continuous mass of mercury from the bulb to the calibration chamber. Next the thermometer is heated to the temperature at which the corresponding stain marking for the thermometers of all groups is at the same distance from the base, in this instance 102° F., and the column is interrupted (gapped) at this point by applying thereto a narrow high intensity zone of energy such as immediately above described, e.g., a laser beam.

The mercury in the column above the interruption slowly ascends to swell the mass of the mercury previously present in the calibration chamber. The column below the interruption remains immobile. The thermometer now is complete except for the removal of the calibration chamber containing the excess mercury. It will readily be seen that this last described mercury registration step is far more rapid to accomplish than that previously mentioned since it does not require reading out differentials and the use of many correction water baths of a multitude of temperatures, or centrifuging. Also the accuracy of the finished thermometer is far greater, in the order of ±1/20 of a degree F.

There is another advantage which flows from the step of matching the mercury column to applied markings by the use of a narrow high intensity zone of energy to the column so as to split the same and allow the mercury of the column above the split to retract into the mass of mercury in the calibration chamber, in contradistinction to the previously described matching step wherein the excess mercury above the trap is driven into the calibration chamber. In the driving step the mercury, as the thermometer is centrifuged, calibration chamber outerward, tends to flow to the top of the calibration chamber and thereby opens a passageway from the capillary bore to the gases trapped in the calibration chamber so that gases are present in the bore above the mercury column of a finished thermometer. Upon occasion this causes rejects classified as "retreating indices". Contrariwise, the splitting technique of the last described mercury matching step never permits a gap to be formed at the seal located at the junction of the bore and the calibration chamber so that the finished thermometer is free of air and water vapor above the mercury column.

It should be understood that the splitting technique is also useful in the manufacture of commercial mercury thermometers which do not have traps.

It thus will be seen that I have provided processes which achieve the several objects of my invention and which are well adapted to meet the conditions of practical use.

As various possible embodiments might be made of the above invention, and as various changes might be made in the embodiments above set forth, it is to be understood that all matter herein described or shown in the accompanying drawings, is to be interpreted as illustrative and not in a limiting sense.

Certain features of the present invention disclosed and claimed herein are disclosed but not claimed in my prior copending application Ser. No. 166,596, aforesaid, now U.S. L.P. 3,172,289 dated March 9, 1965.

Having thus described my invention, I claim as new and desire to secure by Letters Patent:

1. A method of stain marking a mercury class thermometer comprising:
(a) providing a sealed scalarly unmarked thermometer blank composed of a reservoir bulb and a shaft having a bore communicating at one end with the bulb and at the other end with a calibrating chamber, the blank containing an excess of mercury;

(b) ascertaining within the range of the markings to be applied, the mercury column temperature rise characteristic of said sealed thermometer blank by measuring the difference in the heights of the mercury column in the bore at two different specific temperatures;

(c) providing a graduated scale, the graduations of which are mutually spaced apart to match the mercury column temperature rise characteristics of the blank;

(d) then using said scale to apply to the shaft in the linear area to be marked heat stainable material in the configuration of such graduations and without consideration of precise registration between the actual level of the mercury column for any temperature and the corresponding scale graduation for that temperature;

(e) then applying heat to the sealed blank so as to stain mark the glass shaft with a scale of stained graduations corresponding to the aforesaid scale;

(f) then cooling the scale stained blank to room temperature;

(g) then transferring sufficient mercury into the calibration chamber of the sealed blank to precisely register the actual level of the column of mercury for all temperatures within the range of markings with the scale graduations for those temperatures; and (h) then removing the calibrating chamber and the mercury therein.

2. A method as set forth in claim 1 wherein the mercury column temperature rise characteristic of the sealed scalarly unmarked thermometer blank is ascertained by:

(a) heating the sealed thermometer blank to the lower of the two specific temperatures, said lower temperature being one at which the top of the mercury column is in the shaft;

(b) then applying a removable marking to the shaft at the height of the top of the column at said lower temperature;

(c) then heating the sealed thermometer blank to the higher of said two specific temperatures, said higher temperature also being one at which the top of the mercury column is in the shaft;

(d) then applying a removable marking to the shaft at the height of the top of the column at said higher temperature; and (e) then measuring the distance between the two removable markings.

3. A method as set forth in claim 1 for stain marking a thermometer with a maximum temperature recording trap above the reservoir bulb, wherein the mercury column temperature rise characteristic of the sealed thermometer blank is ascertained by:

(a) heating the sealed thermometer blank to the lower of the two specific temperatures, said lower temperature being one at which the top of the mercury column is in the shaft.

(b) then applying a removable marking to the shaft at the height of the top of the column at said lower temperature;

(c) then heating the sealed thermometer blank to the higher of said two specific temperatures, said higher temperature also being one at which the top of the column is in the shaft; and (d) then measuring the distance from the removable marking to the height of the top of the column at said higher temperature, the height of the column remaining stationary during measuring due to the presence of the maximum temperature recording trap.

4. A method as set forth in claim 1 wherein the mercury column temperature rise characteristic of the sealed thermometer blank is ascertained by:

(a) forming the mercury into a continuous mass from the reservoir bulb to the calibrating chamber and as a column through the bore;

(b) then heating the sealed thermometer blank to the lower of the two specific temperatures;

(c) then interrupting said column at a point a predetermined distance from the tip of the reservoir bulb by applying a laser beam to said point so as to gap the column and permit the mercury above the gap to rise up to swell the mercury in the calibrating chamber;

(d) then heating the sealed thermometer blank to the higher of said two specific temperatures, said higher temperature being one at which the tip of the mercury column is in the shaft; and (e) then measuring the distance from the point at which the column was interrupted to the height of the top of the column at said higher temperature.

5. A method as set forth in claim 1 for stain marking a thermometer having a maximum temperature recording trap above the reservoir bulb, wherein the mercury column temperature rise characteristic of the sealed thermometer blank is ascertained and sufficient mercury is transferred into the calibrating chamber of the sealed blank to precisely register the actual level of the column of mercury for all temperatures within the range of markings with the stained scale graduations for those temperatures by:

(a) before the shaft is marked with heat stainable material in the form of a scale of graduations
  (1) heating the sealed thermometer blank to a first temperature at which the height of the mercury at the top of the column is in the bore above the trap;
  (2) then removing to the calibrating chamber the mercury in the bore above the trap;
  (3) then heating the sealed thermometer blank to a second temperature higher than the first temperature and at which the height of the top of the column is in the bore above the trap, said second temperature being the lower of the two specific temperatures;
  (4) then applying a first heat stable removable marking to the shaft at the height of the mercury column at the second temperature;
  (5) then heating the sealed thermometer blank to a third temperature higher than the second temperature and at which the height of the top of the column is in the bore above the trap, said third temperature being the higher of the two specific temperatures;
  (6) then applying a second heat stable removable marking to the shaft at the height of the mercury column at the third temperature;
  (7) then measuring the distance between the first and second heat stainable removable marks;

(b) after the shaft is stain marked with scale graduations
  (1) ascertaining the temperature differential between one of the markings and the stained scale graduation for the corresponding temperature;
  (2) then arranging the mercury into a continuous mass filling the reservoir bulb and the trap and extending into the bore at a temperature below the first temperature;
  (3) then heating the sealed thermometer blank to a fourth temperature equal to the first temperature plus the temperature differential; and
  (4) then removing to the calibrating chamber mercury in the bore above the trap, said calibrating chamber then being ready for removal with the mercury therein as set forth in claim 1.

6. A method as set forth in claim 1 for stain marking a thermometer with a maximum temperature recording trap above the reservoir bulb, wherein sufficient mercury is transferred into the calibrating chamber of the sealed blank to precisely register the actual level of the column of mercury for all temperatures within the range of markings with the scale graduations for those temperatures by:

(a) at a first temperature arranging the mercury in a continuous mass filling the reservoir bulb and the trap and extending into the bore;

(b) then at said first temperature removing to the calibrating chamber the mercury in the bore above the trap;

(c) then heating the sealed thermometer blank to a second temperature within the scale range at which the height of the mercury at the top of the column is in the bore above the trap and lies physically within the scale of stained graduations;

(d) then ascertaining the temperature differential between the top of the column in the bore and the stained scale graduation corresponding to the second temperature;

(e) then at a third temperature arranging the mercury in a continuous mass, filling the reservoir bulb and the trap and extending into the bore, said third temperature being equal to the first temperature plus the temperature differential; and (f) then removing to the calibrating chamber the mercury in the bore above the trap, said calibrating chamber then being ready for removal with the mercury therein as set forth in claim 1.

7. A method as set forth in claim 1 wherein sufficient mercury is transferred into the calibrating chamber of the sealed blank to precisely register the actual level of the column of mercury for all temperatures within the range of markings with the scale graduations for those temperatures by:

(a) forming the mercury into a continuous mass from the reservoir bulb to the calibrating chamber and as a column through the bore;

(b) then heating the sealed thermometer blank to a first temperature which is within the range of the stained scale graduations, and (c) then interrupting said column at a point at which the stained scale graduation coincides with said first temperature by applying a laser beam to said point so as to gap the column at said point and permit the mercury above the gap to rise up to swell the mercury in the calibrating chamber, said calibrating chamber then being removable with the mercury therein as set forth in claim 1.

8. A method as set forth in claim 1 for stain marking a thermometer having a maximum temperature recording trap above the reservoir bulb, wherein sufficient mercury is transferred into the calibrating chamber of the sealed blank to precisely register the actual level of the column of mercury for all temperatures within the range of markings with the scale graduations for those temperatures by:

(a) at a first temperature arranging the mercury in a continuous mass filling the reservoir bulb and the trap and extending into the bore;

(b) then at said first temperature removing to the calibrating chamber the mercury in the bore above the trap;

(c) then heating the sealed thermometer blank to a second temperature within the scale range at which the height of the mercury at the top of the column is in the bore above the trap and lies physically within the scale of stained graduations;

(d) said first temperature being so selected that at said second temperature the height of the mercury at the top of the column is above the corresponding stained graduation for the second temperature; and (e) then volatilizing the mercury in the bore above the stained graduation for the second temperature and permitting the mercury vapor to condense in proximity to the mercury in the calibrating chamber, said calibrating chamber then being removable with the mercury therein as set forth in claim 1.

9. A method as set forth in claim 1 wherein the heat stainable material in the configuration of graduations is applied to the shaft with a preselected intermediate scale graduation of the scale, which graduation corresponds to a preselected temperature, located a preselected distance from the tip of the bulb end of the sealed blank.

10. A method as set forth in claim 1 wherein the sealed blank is annealed and stain marked concurrently, and wherein the heating and the cooling of the blank anneals the blank over the full length thereof.

11. In a method of marking a sealed mercury thermometer blank composed of a reservoir bulb and a shaft having a bore communicating at one end with the bulb and at the other end with a calibrating chamber: that improvement comprising at a specific temperature forming the mercury in the sealed blank into a continuous mass running from the reservoir bulb to the calibrating chamber and as a column through the bore and thereafter interrupting said column at a point by applying a laser beam to said point so as to gap the column and permit the mercury above the gap to rise up and swell the mercury in the calibrating chamber.

References Cited by the Examiner

UNITED STATES PATENTS

| | | | |
|---|---|---|---|
| 2,622,443 | 12/1952 | Wappner | 73—371 |
| 3,172,289 | 3/1965 | Blackman | 73—371 |
| 3,183,721 | 5/1965 | Kayman | 73—371 |

DONALL H. SYLVESTER, *Primary Examiner.*

G. R. MEYERS, *Assistant Examiner.*